United States Patent
Ding et al.

(10) Patent No.: US 11,199,495 B2
(45) Date of Patent: *Dec. 14, 2021

(54) TERAHERTZ FULL POLARIZATION STATE DETECTION SPECTROMETER

(71) Applicants: Shenzhen Institute of Terahertz Technology and Innovation Co., Ltd., Shenzhen (CN); Shenzhen Institute of Terahertz Technology and Innovation, Shenzhen (CN)

(72) Inventors: Qing Ding, Shenzhen (CN); Yi Pan, Shenzhen (CN); Shichang Peng, Shenzhen (CN)

(73) Assignees: Shenzhen Institute of Terahertz Technology and Innovation Co., Ltd., Shenzhen (CN); Shenzhen Institute of Terahertz Technology and Innovation, Shenzhen (CN)

( * ) Notice: Subject to any disclaimer, the term of this patent is extended or adjusted under 35 U.S.C. 154(b) by 128 days.

This patent is subject to a terminal disclaimer.

(21) Appl. No.: 15/749,979

(22) PCT Filed: Dec. 15, 2016

(86) PCT No.: PCT/CN2016/110018
§ 371 (c)(1),
(2) Date: Feb. 2, 2018

(87) PCT Pub. No.: WO2018/058798
PCT Pub. Date: Apr. 5, 2018

(65) Prior Publication Data
US 2019/0003964 A1 Jan. 3, 2019

(30) Foreign Application Priority Data
Sep. 27, 2016 (CN) .......................... 201610856759.9

(51) Int. Cl.
*G01N 21/3581* (2014.01)
*G01N 21/21* (2006.01)

(52) U.S. Cl.
CPC ......... *G01N 21/3581* (2013.01); *G01N 21/21* (2013.01); *G01N 2201/0636* (2013.01);
(Continued)

(58) Field of Classification Search
CPC ............... G01N 21/3581; G01N 21/21; G01N 2201/0636; G01N 21/0638; G01N 21/0683
(Continued)

(56) References Cited

U.S. PATENT DOCUMENTS 3,419,802 A * 12/1968 Pelenc ................. G01R 15/246
324/96
3,439,968 A * 4/1969 Horton ................. G02B 5/3066
359/352
(Continued)

*Primary Examiner* — Blake C Riddick
(74) *Attorney, Agent, or Firm* — Young Basile Hanlon & MacFarlane, P.C.

(57) ABSTRACT

The invention relates to a terahertz full polarization state detection spectrometer, which comprises a terahertz wave generator, a polarizer, a polarization splitter, a horizontal terahertz detector and a vertical terahertz detector. The terahertz wave generator generates a terahertz wave and the polarizer optimizes the terahertz wave for purity. The sample to be detected modulates the terahertz wave after purity optimization to obtain the terahertz modulated wave. The terahertz modulated wave is decomposed by the polarization splitter into a horizontal terahertz wave and a vertical terahertz wave whose polarization states are perpendicular to each other. The two terahertz waves are detected by two corresponding terahertz detectors respectively. According to the detected result, the characteristic of the sample is analyzed. The terahertz full polarization state detection spectrometer can quickly and accurately detect all kinds of full
(Continued)

polarization state terahertz waves and improve the detection accuracy and efficiency of the sample.

14 Claims, 2 Drawing Sheets

(52) U.S. Cl.
CPC ............... *G01N 2201/0638* (2013.01); *G01N 2201/0683* (2013.01); *G01N 2201/06113* (2013.01)

(58) Field of Classification Search
USPC .......... 250/341.1, 338.1, 353, 339.07, 341.3
See application file for complete search history.

(56) References Cited

U.S. PATENT DOCUMENTS

| | | | | |
|---|---|---|---|---|
| 3,822,098 | A * | 7/1974 | Rudder | G01J 3/36 356/320 |
| 5,181,214 | A * | 1/1993 | Berger | H01S 3/042 372/21 |
| 5,499,256 | A * | 3/1996 | Bischel | H01S 5/141 372/12 |
| 5,934,780 | A * | 8/1999 | Tanaka | G02B 5/3066 362/19 |
| 5,952,818 | A * | 9/1999 | Zhang | G01R 29/0885 324/96 |
| 6,111,416 | A * | 8/2000 | Zhang | G01N 21/3581 324/244.1 |
| 6,190,016 | B1 * | 2/2001 | Suzuki | G02B 5/3025 362/19 |
| 6,747,736 | B2 * | 6/2004 | Takahashi | G01N 21/3581 356/319 |
| 2002/0044236 | A1 * | 4/2002 | Suzuki | G02B 5/3066 349/96 |
| 2003/0001558 | A1 * | 1/2003 | Zhang | G01R 29/0885 324/96 |
| 2003/0016706 | A1 * | 1/2003 | Flint | H01S 3/08004 372/20 |
| 2003/0081317 | A1 * | 5/2003 | Katsumata | G02B 27/283 359/566 |
| 2004/0155665 | A1 * | 8/2004 | Arnone | G01N 21/3581 324/644 |
| 2005/0179905 | A1 * | 8/2005 | Ohtake | G01J 3/12 356/450 |
| 2005/0213043 | A1 * | 9/2005 | Nakashima | G03B 21/14 353/20 |
| 2005/0253071 | A1 * | 11/2005 | Ferguson | G01N 21/3581 250/341.1 |
| 2006/0007385 | A1 * | 1/2006 | Murata | G02F 1/1393 349/179 |
| 2006/0231762 | A1 * | 10/2006 | Ohtake | G01N 21/552 250/341.8 |
| 2008/0149819 | A1 * | 6/2008 | Zhdaneev | G01N 21/3581 250/255 |
| 2008/0176332 | A1 * | 7/2008 | Berns | C12M 35/02 436/55 |
| 2008/0239317 | A1 * | 10/2008 | Schulkin | G01J 4/00 356/365 |
| 2011/0220799 | A1 * | 9/2011 | Kim | H01Q 15/0086 250/338.1 |
| 2012/0206724 | A1 * | 8/2012 | Herzinger | G01N 21/211 356/367 |
| 2013/0026368 | A1 * | 1/2013 | Herzinger | G01N 21/211 250/341.3 |
| 2013/0101248 | A1 * | 4/2013 | Takasaka | G02B 6/2793 385/11 |
| 2014/0041456 | A1 * | 2/2014 | Rembe | G01H 9/00 73/655 |
| 2014/0191131 | A1 * | 7/2014 | Uchida | G02F 1/3544 250/341.8 |
| 2014/0198973 | A1 * | 7/2014 | Zhang | G01J 3/42 382/149 |
| 2014/0264032 | A1 * | 9/2014 | Neshat | G01J 3/42 250/339.08 |
| 2015/0146200 | A1 * | 5/2015 | Honda | G01N 21/956 356/237.5 |
| 2015/0153234 | A1 * | 6/2015 | Kozlov | G01J 5/0803 250/341.1 |
| 2015/0164327 | A1 * | 6/2015 | Yaroslavsky | G01N 21/21 600/476 |
| 2015/0205079 | A1 * | 7/2015 | Takayanagi | G01N 21/3581 250/338.1 |

* cited by examiner

TERAHERTZ FULL POLARIZATION STATE DETECTION SPECTROMETER

CROSS-REFERENCE TO RELATED APPLICATION(S)

This application is a 371 application of International Application No. PCT/CN2016/110018, filed on Dec. 15, 2016, which claims priority to Chinese Patent Application No. 201610856759.9, filed on Sep. 27, 2016, the content of which is hereby incorporated by reference in its entirety.

TECHNICAL FIELD

The invention relates to the field of terahertz wave detection, and in particular to a terahertz full polarization state detection spectrometer.

BACKGROUND

Terahertz full polarization state detection can be applied to studies of many fields, such as detection of terahertz optical devices, including terahertz prisms, a wave plate, and photoconductive antenna sensitive to a polarization state. Terahertz full polarization state detection can also be applied to the biological field, such as detection of a biomolecule with chiral characteristic, e.g., amino acid and protein. Biomolecule with chiral characteristic has different absorptions of terahertz's left-rotated or right-rotated circularly polarized light. This phenomenon is also called circular dichroism. A wide range of application fields makes the study of terahertz full polarization state detection spectrometer have great value.

In order to measure the multiple polarization states caused by the circular dichroism or optical active device, terahertz full polarization state detection spectrometer must be capable of measuring the amplitude and phase of the orthogonal field components of terahertz waves. The measurement can use an electro-optical crystal or a conventional photoconductive antenna receiver, but the electro-optic crystal or the photoconductive antenna must be rotated to independently detect each polarization state. Such mechanical adjustment not only requires long measurement time but also causes great measurement errors.

SUMMARY

Based on this, it is necessary to provide a terahertz full polarization state detection spectrometer, which can quickly and accurately detect all kinds of full polarization state terahertz waves, and improve the detection accuracy and efficiency of a sample to be detected.

A terahertz full polarization state detection spectrometer, comprising: a terahertz wave generator used to generate terahertz waves with linearly polarized state by lasers; a polarizer located at the radiation end of the terahertz wave generator, for receiving the terahertz wave radiation and filtering stray light in the terahertz wave, converting the terahertz wave to a linearly polarized light with higher polarization state purity, and the linearly polarized light output by the polarizer is used to generate modulated wave after irradiating a detected sample; a polarization splitter located in the transmission path of the terahertz modulated wave, for decomposing the terahertz modulated wave into a horizontal terahertz wave and a vertical terahertz wave with perpendicular polarization states; a horizontal terahertz detector located in the transmission path of the horizontal terahertz wave for detecting the horizontal terahertz wave; a vertical terahertz detector located in the transmission path of the vertical terahertz wave for detecting the vertical terahertz wave.

In an embodiment, the polarizer comprises two multilayer wafers with the same structure, the two multilayer wafers are tilted to a V-shaped angle, and the angle between each of the multilayer wafers and the beam formed by the terahertz wave is Brewster angle.

In an embodiment, the multilayer wafer is a four-layer wafer.

In an embodiment, the terahertz wave generator is a GaAs photoconductive antenna.

In an embodiment, the polarization splitter is a metal wire grating splitter.

In an embodiment, the terahertz full polarization state detection spectrometer further comprises a first off-axis parabolic mirror and a second off-axis parabolic mirror, wherein the first off-axis parabolic mirror is used to focus the linearly polarized light generated by the polarizer on the detected sample, and the second off-axis parabolic mirror is used to send the terahertz modulated wave to the polarization splitter after collimating the terahertz modulated wave.

In an embodiment, the terahertz full polarization state detection spectrometer further comprises a laser light source for generating lasers.

In an embodiment, the terahertz full polarization state detection spectrometer further comprises beam splitters in a laser light path, wherein the beam splitters comprise a first beam splitter and a second beam splitter, wherein the first beam splitter is used to divide the laser into a first beam and a second beam, the first beam is used for pumping the terahertz wave generator to generate the terahertz wave, the second beam is divided into a third beam and a fourth beam by the second beam splitter, the third beam is used to excite the horizontal terahertz detector to detect the horizontal terahertz wave, and the fourth beam is used to excite the vertical terahertz detector to detect the vertical terahertz wave.

In an embodiment, the terahertz full polarization state detection spectrometer further comprises a first delay line, a second delay line, and a third delay line, wherein the first delay line is used to transmit the first beam to the terahertz wave generator after delay processing, the second delay line is used to transmit the third beam to the horizontal terahertz detector after delay processing, the third delay line is used to transmit the fourth beam to the vertical terahertz detector after delay processing t, so that the time of the lasers processed by the beam splitters reaching the terahertz wave generator, the horizontal terahertz detector and the vertical terahertz detector is the same.

In an embodiment, the terahertz full polarization state detection spectrometer further comprises three sets of lenses and focusing lenses, which are respectively a first lens and a first focusing lens, a second lens and a second focusing lens, a third lens and a third focusing lens, the terahertz wave generator, the horizontal terahertz detector and the vertical terahertz detector are respectively connected between a set of lens and focusing lens, the first lens is used to transmit the first beam to the terahertz wave generator after focusing processing, the first focusing lens is used to transmit the terahertz wave generated by the terahertz wave generator to the polarizer after collimating, the second lens is used to transmit the third beam to the horizontal terahertz detector after focusing processing, the second focusing lens is used to transmit the horizontal terahertz wave to the horizontal terahertz detector after focusing processing, the third lens is used to transmit the fourth beam to the vertical terahertz detector after focusing processing, and the third focusing lens is used to transmit the vertical terahertz wave to the vertical terahertz detector after focusing processing.

The aforementioned terahertz full polarization state detection spectrometer comprises a terahertz wave generator, a polarizer, a polarization splitter, a horizontal terahertz detector and a vertical terahertz detector. The terahertz wave generator generates a terahertz wave and the polarizer optimizes the terahertz wave for purity. The sample to be detected modulates the terahertz wave after purity optimization to obtain the terahertz modulated wave. The terahertz modulated wave is decomposed by the polarization splitter into a horizontal terahertz wave and a vertical terahertz wave whose polarization states are perpendicular to each other. The two terahertz waves are detected by two corresponding terahertz detectors respectively. According to the detected result, the characteristic of the sample is analyzed. The terahertz full polarization state detection spectrometer can quickly and accurately detect all kinds of full polarization state terahertz waves and improve the detection accuracy and efficiency of the sample.

BRIEF DESCRIPTION OF THE DRAWINGS

In order to illustrate the embodiments of the invention or the existing technical solutions more clearly, drawings to be used for describing the embodiments are introduced briefly. Obviously, the following drawings are merely a few embodiments of the present invention. Persons skilled in the art can obtain drawings of other embodiments according to these drawings without paying creative effort.

DETAILED DESCRIPTION

In order to make the objectives, technical solutions, and advantages of the invention to be clearer, the invention is further described in conjunction with appended drawings and embodiments. It should be understood that the specific embodiments described herein are used only to explain the present invention and are not intended to limit the invention.

Unless otherwise defined, all technology and science terminologies herein have the same meanings commonly understood by persons skilled in this field to which this invention belongs. Terminologies used in this specification of the invention are merely intended to describe specific embodiments and are not limited to this invention. The phrase "and/or" used herein comprises arbitrary and all the combinations of one or more related listed items.

Figure 1:
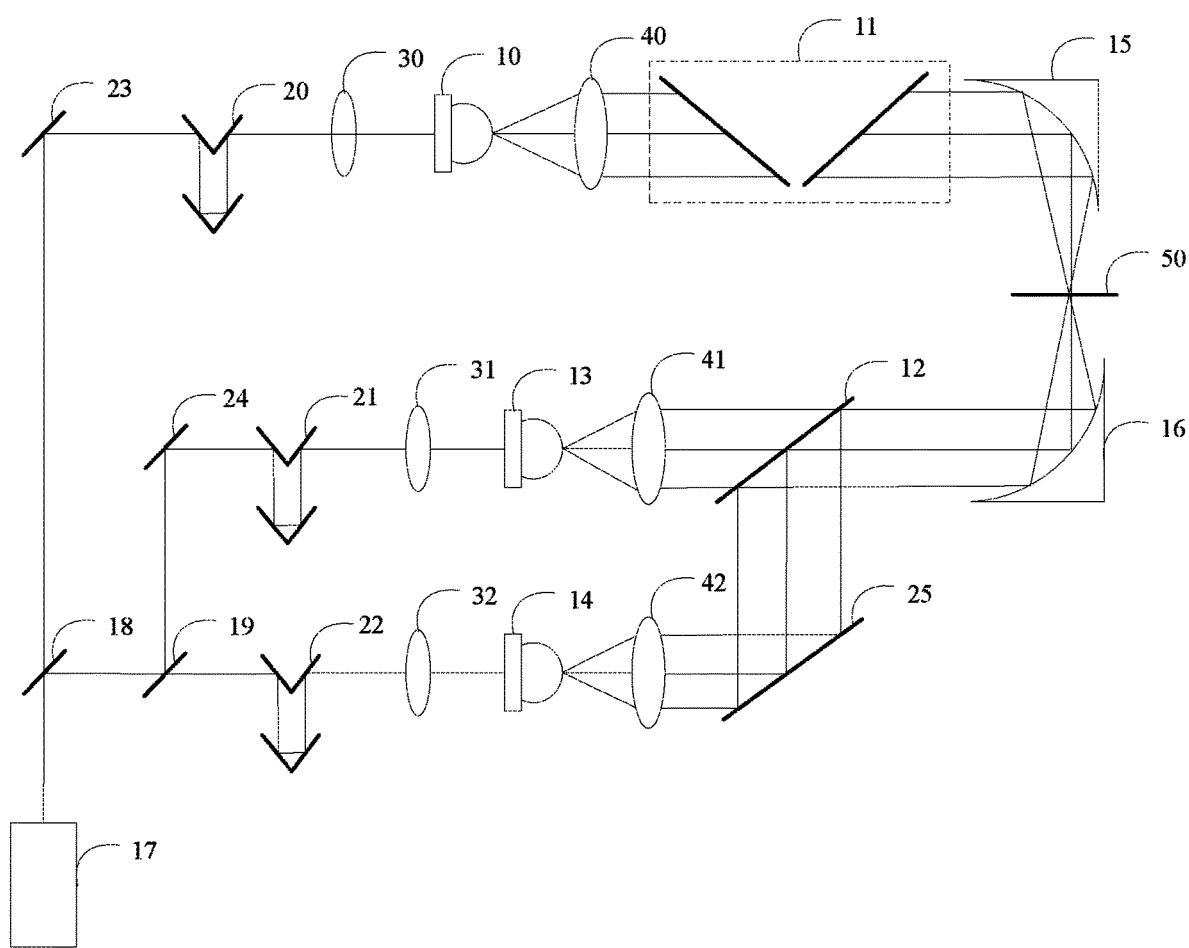
FIG. 1 is a structural diagram of the terahertz full polarization state detection spectrometer according to an embodiment.

Refer to FIG. 1. FIG. 1 is a structure diagram of a terahertz full polarization state detection spectrometer according to an embodiment.

In this embodiment, the terahertz full polarization state detection spectrometer includes a terahertz wave generator 10, a polarizer 11, a polarization splitter 12, a horizontal terahertz detector 13 and a vertical terahertz detector 14.

The terahertz wave Generator 10 is used to generate terahertz waves with linearly polarized state using lasers. The terahertz wave generator 10 is a GaAs photoconductive antenna. The GaAs photoconductive antenna is a coplanar antenna, which generates terahertz radiation under the pumping action of the laser, i.e., emitting terahertz wave, and the terahertz wave is linearly polarized light.

The polarizer 11 is located at the radiant end of the terahertz wave generator 10, for filtering stray light in the terahertz wave, converting the terahertz wave into a linearly polarized light with higher polarization state purity. The linearly polarized light output by the polarizer 11 is used to generate terahertz modulated waves after irradiating a sample 50. Terahertz waves generated by the terahertz wave generator 10 are mainly linearly polarized lights. There are a few stray lights with polarization state different from that of the linearly polarized lights. These stray lights need to be filtered to obtain linearly polarized lights with higher purity, so as to improve the accuracy of sample detection. The polarizer 11 allows the desired linearly polarized lights to pass and reflects the undesired stray light so that stray light will not enter into the subsequent detection system.

In an embodiment, the polarizer 11 includes two multilayer wafers with the same structure. The two multilayer wafers are tilted to a V shape. Each layer of the wafer is high resistivity. A single layer of the wafer is rectangular, the size can be 100 mm in length, 30 mm in width, and 0.5 mm in thickness. The multilayer wafer may have four layers. The angle between each multilayer wafer and the beam formed by the terahertz wave is Brewster angle. After the stray light is reflected by the polarizer 11, the reflected light is converted into a linearly polarized light. The linearly polarized light, whose propagation direction is perpendicular to the aforementioned linearly polarized light propagating along the horizontal direction, is reflected by the polarizer 11, and thus will not enter the subsequent detection system. The desired linearly polarized lights, i.e., linearly polarized terahertz waves propagating along the horizontal direction, can pass successfully. The extinction ratio of the polarizer 11 can reach up to $10^4$. The linearly polarized light with higher polarization state purity can be obtained, and the extinction effect is good.

The polarization splitter 12 is located in the transmission path of the terahertz modulated wave to decompose the terahertz modulated wave into a horizontal terahertz wave and a vertical terahertz wave with perpendicular polarization states.

Figure 2:
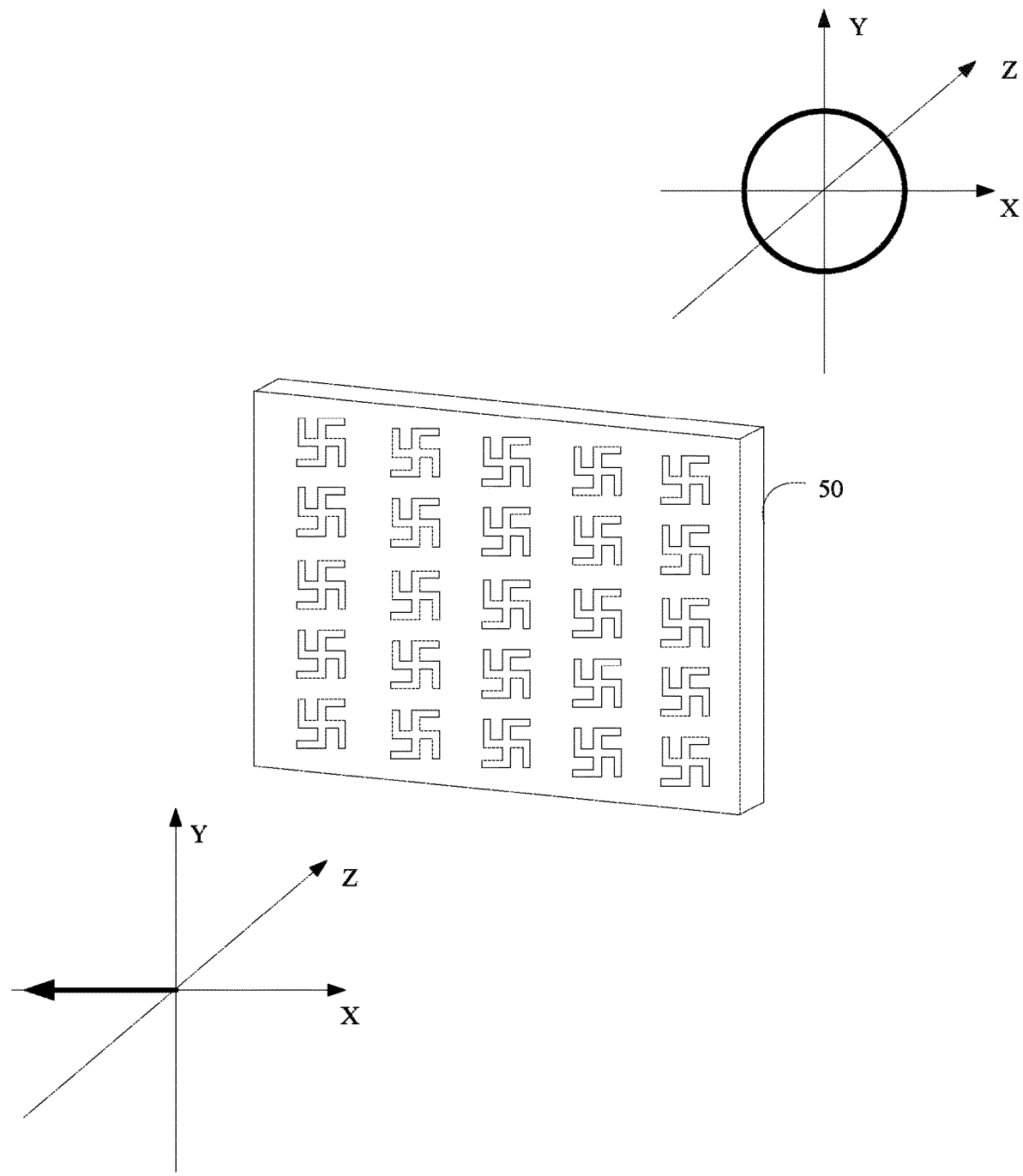
FIG. 2 is a schematic diagram of modulating terahertz waves by a sample to be detected according to an embodiment.

Refer to FIG. 2. FIG. 2 is a schematic diagram of modulating the terahertz waves by the sample 50 to be detected according to an embodiment. The sample 50 has a metamaterial structure, the surface of which has unique swastikas with a periodic structure. The swastikas have optical activity. The three-dimensional coordinate system is the one where the terahertz wave is located before and after being modulated by the sample 50. The black arrow indicates the light vector before the terahertz wave is modulated, and the circle indicates the track of the light vector formed after the terahertz wave is modulated. As can be seen after being modulated by the sample 50, the terahertz wave of the linearly polarized state is converted into terahertz wave of circularly polarized state, namely circularly polarized light.

In practical detection, the sample 50 may be other materials, and the terahertz wave of linearly polarized state may be converted to have other full polarization states after modulation, such as linearly polarized state or elliptically polarized state.

The polarization splitter 12 is a metal wire grating splitter, which is composed of parallel tungsten wires of equidistant arrangement, and the distance can be 5 microns. During the working process, the polarization splitter 12 is powered on, and for an incident electromagnetic wave polarized in the direction of the wire grating, the polarization splitter 12 acts as a typical metal plate, reflecting most of them. If the polarization direction of the incident electromagnetic wave is perpendicular to the metal wire grating, the electromagnetic wave can pass the polarization splitter 12 successfully.

The circularly polarized light, after being modulated by the sample 50, is projected on the metal wire grating splitter. In the circularly polarized light, the terahertz wave component whose polarization direction is parallel to the metal wire grating is reflected, and the terahertz wave component whose polarization direction is perpendicular to the metal wire grating passes the metal wire grating splitter successfully. The circularly polarized light, after passing the metal wire grating splitter, is decomposed into two beams with polarization directions perpendicular to each other, which are a horizontal terahertz wave and a vertical terahertz wave respectively.

The horizontal terahertz detector 13 is in the transmission path of the horizontal terahertz wave to detect the horizontal terahertz wave.

The vertical terahertz detector 14 is in the transmission path of the vertical terahertz wave to detect the vertical terahertz wave.

Both the horizontal terahertz wave and the vertical terahertz wave are linearly polarized lights. Two terahertz detectors are set to detect these two linearly polarized lights to obtain the amplitude and phase of the orthogonal field component of the circularly polarized light, and then the characteristic of the circularly polarized light is analyzed to obtain the characteristic of the detected object.

This technical solution is also applicable to the detection of linearly polarized light and elliptically polarized light. Both the linearly and elliptically polarized lights can be decomposed into orthogonal field components to realize detection. Both terahertz detectors use dipole detection antennas to receive only terahertz waves whose polarization state is parallel to the axis of the dipole. For example, the polarization direction of the horizontal terahertz wave obtained after the polarization splitter 12 is parallel to the axis of the dipole of the horizontal terahertz detector. The horizontal terahertz detector 13 only receives the horizontal terahertz wave, and the terahertz polarizer is not required to process the terahertz wave. As a result, the detection precision is high and the structure is simple.

The above terahertz detector 10 can determine that the received terahertz wave is in the linearly polarized state or another polarization state according to light intensity. Then, the terahertz modulated wave is analyzed to obtain the polarization state, amplitude, and phase of the orthogonal field component, to realize detecting the terahertz modulated wave in the full polarization state. The characteristic of the sample 50 is analyzed according to the detection result.

In an embodiment, the terahertz full polarization state detection spectrometer also includes a first off-axis parabolic mirror 15 and a second off-axis parabolic mirror 16, wherein the first off-axis parabolic mirror 15 is used to focus the linearly polarized light generated by the polarizer 11 on the sample 50 to be detected, and the second off-axis parabolic mirror 16 is used to transmit the terahertz modulated wave to the polarization splitter 12 after collimating. The terahertz wave emitted by the polarizer 11 is a high purity linearly polarized light propagating horizontally, which is projected on the sample 50 after being focused by the first off-axis parabolic mirror 15 to detect the sample 50. The terahertz wave modulated by the sample 50 is divergent. The terahertz modulated wave is collimated by the second off-axis parabolic mirror 16 to convert to a terahertz modulated wave propagating horizontally and then is sent to the polarization splitter 12.

In an embodiment, the terahertz full polarization state detection spectrometer also comprises a laser light source 17. The laser light source 17, acting as a light source for the terahertz full polarization state detection spectrometer, provides lasers that generate terahertz waves and lasers that excite the horizontal terahertz detector 13 and the vertical terahertz detector 14. The laser light source 17 is a femtosecond laser, which is a Ti-sapphire laser. The center wavelength of the laser is 800 nm, the laser pulse width is 100 fs, and the power is 100 mw.

In an embodiment, the terahertz full polarization state detection spectrometer also comprises beam splitters on a laser light path. The beam splitters comprise a first beam splitter 18 and a second beam splitter 19. The first splitter 18 is used to divide the laser into a first beam and a second beam, wherein the first beam is used for pumping terahertz wave generator 10 to generate the terahertz wave, and the second beam is divided into a third beam and a fourth beam by the second splitter 19. The third beam is used to excite the horizontal terahertz detector 13 to detect the horizontal terahertz wave, and the fourth beam is used to excite the vertical terahertz detector 14 to detect the vertical terahertz wave.

The laser generated by the laser light source 17 is divided into three beams, wherein one beam is used for pumping terahertz wave generator 10 for terahertz radiation to generate linearly polarized terahertz wave, and the other one is split into two beams, to respectively excite two terahertz detectors to detect the orthogonal field components of the terahertz modulated wave.

The laser, which is used to pump terahertz wave generator 10 for terahertz radiation, is sent to the terahertz wave generator 10 after its propagation direction is changed by the first reflector 23. The laser used to excite the horizontal terahertz detector 13 is sent to the horizontal terahertz detector 13 after its propagation direction is changed by the second reflector 24. The propagation directions of the three laser beams are horizontal, not interfering with each other.

In an embodiment, the terahertz full polarization state detection spectrometer also comprises a first delay line 20, a second delay line 21 and a third delay line 22. The first delay line 20 sends the first beam to the terahertz wave generator 10 after delay processing, the second delay line 21 sends the third beam to the level terahertz detector 13 after delay processing, and the third delay line 22 sends the fourth beam to the vertical terahertz detector 14 after delay processing, so that the time for the laser processed by the beam splitter reaching the terahertz wave generator 10, the horizontal terahertz detector 13 and the vertical terahertz detector 14 is the same.

The orthogonal field components of terahertz modulated waves need to be detected in real time when the sample 50 is detected to improve the detection accuracy. Since the laser is divided, the transmission paths of beams are different, and the time for these beams reaching the terahertz wave generator 10, the horizontal terahertz detector 13 and the vertical terahertz detector 14 is different. In order to make the three beams work simultaneously, to realize the real-time detection of the sample 50, and to reduce measurement error, the optical delay line is respectively arranged in the transmission paths of the three laser beams. The delay time of the first delay line 20 can be set longest, the delay time of the second delay line 21 takes the second place, and the delay time of the third delay line 22 is the shortest.

In an embodiment, the terahertz full polarization state detection spectrometer also comprises three sets of lenses and focusing lenses, which are respectively a first lens 30 and a first focusing lens 40, a second lens 31 and a second focusing lens 41, and a third lens 32 and a third focusing lens 42. The terahertz wave generator 10, the horizontal terahertz detector 13 and the vertical terahertz detector 14 are respectively connected between a set of lenses and a focusing lens. The first lens 30 sends the first beam to the terahertz wave generator 10 after focusing processing. The first focus lens 40 sends the terahertz wave generated by the terahertz wave generator 10 to the polarizer 11 after collimating. The second lens 31 sends the third beam to the horizontal terahertz detector 13 after focusing processing. The second focusing lens 41 sends the horizontal terahertz wave to the horizontal terahertz detector 13 after focusing processing. The third lens 32 sends the four beams to the vertical terahertz detector 14 after focusing processing. The third focusing lens 42 sends the vertical terahertz wave to the vertical terahertz detector 14 after focusing processing.

The terahertz modulated light is decomposed by the polarization splitter 12 into two beams of terahertz waves, and the polarization directions and the propagation directions of the two beams of terahertz waves are perpendicular to each other. Among them, the vertical terahertz wave, after its propagation direction is changed by the third reflector 25, is sent to the third focusing lens 42 for focusing processing. The sensitivity of the terahertz detector is improved, so as to improve the detection accuracy.

In the aforementioned terahertz full polarization state detection spectrometer, the terahertz wave generator 10 generates a terahertz wave and the polarizer 11 optimizes the terahertz wave for purity. The sample 50 to be detected modulates the terahertz wave after purity optimization to obtain a terahertz modulated wave, and an off-axis parabolic mirror focuses and collimates the terahertz wave before and after modulation to improve the detection effect. The terahertz modulated wave is decomposed by the polarization splitter 12 into a horizontal terahertz wave and a vertical terahertz wave whose polarization states are perpendicular to each other. The two terahertz waves are detected by two corresponding terahertz detectors respectively. According to the detected result, the characteristic of the sample is analyzed. An optical delay line is added to each laser branch to ensure real-time sample detection. The terahertz full polarization state detection spectrometer can quickly and accurately detect all kinds of full polarization state terahertz waves and improve the detection accuracy and efficiency of the sample.

The technical features in the above embodiments can be combined arbitrarily. For simplicity, not all possible combinations of the technical features in the above embodiments are described. However, these combinations of the technical features should be within the scope recited in this specification, provided that there is no conflict in these combinations of the technical features.

The above embodiments merely express several implementing ways specifically and in detail. However, this cannot be constructed as a limit to the scope of this invention. It should be noted that persons skilled in the art can make many variations and modifications without departing from the spirit of this invention, all of which belong to the scope of this invention. Therefore, the scope of the present application should be determined by the terms of the accompanying claims.

What is claimed is:

1. A terahertz full polarization state detection spectrometer, comprising:
    a terahertz wave generator used to generate a terahertz wave with a linearly polarized state by lasers;
    a polarizer located at a radiation end of the terahertz wave generator, for receiving the terahertz wave and filtering stray light in the terahertz wave, converting the terahertz wave to a linearly polarized light with higher polarization state purity, and the linearly polarized light output by the polarizer is used to generate a terahertz modulated wave after irradiating a detected sample;
    a polarization splitter located in a transmission path of the terahertz modulated wave, for decomposing the terahertz modulated wave into a horizontal terahertz wave and a vertical terahertz wave with perpendicular polarization states;
    a horizontal terahertz detector located in a transmission path of the horizontal terahertz wave for detecting the horizontal terahertz wave; and
    a vertical terahertz detector located in a transmission path of the vertical terahertz wave for detecting the vertical terahertz wave.

2. The terahertz full polarization state detection spectrometer according to claim 1, wherein the polarizer comprises two multilayer wafers with a same structure, the two multilayer wafers are tilted to a V-shaped angle, and an angle between each of the two multilayer wafers and a beam formed by the terahertz wave is a Brewster angle.

3. The terahertz full polarization state detection spectrometer according to claim 2, wherein each of the two multilayer wafers is a four-layer wafer.

4. The terahertz full polarization state detection spectrometer according to claim 1, wherein the terahertz wave generator is a GaAs photoconductive antenna.

5. The terahertz full polarization state detection spectrometer according to claim 1, wherein the polarization splitter is a metal wire grating splitter.

6. The terahertz full polarization state detection spectrometer according to claim 1, further comprising a first off-axis parabolic mirror and a second off-axis parabolic mirror, wherein the first off-axis parabolic mirror is used to focus the linearly polarized light generated by the polarizer on the detected sample, and the second off-axis parabolic mirror is used to send the terahertz modulated wave to the polarization splitter after collimating the terahertz modulated wave.

7. The terahertz full polarization state detection spectrometer according to claim 1, further comprising a laser light source for generating lasers.

8. The terahertz full polarization state detection spectrometer according to claim 7, further comprising beam splitters in a laser light path, wherein the beam splitters comprise a first beam splitter and a second beam splitter, wherein the first beam splitter is used to divide the laser into a first beam and a second beam, the first beam is used for pumping the terahertz wave generator to generate the terahertz wave, the second beam is divided into a third beam and a fourth beam by the second beam splitter, the third beam is used to excite the horizontal terahertz detector to detect the horizontal terahertz wave, and the fourth beam is used to excite the vertical terahertz detector to detect the vertical terahertz wave.

9. The terahertz full polarization state detection spectrometer according to claim 8, further comprising a first delay line, a second delay line, and a third delay line, wherein the first delay line is used to transmit the first beam to the terahertz wave generator after delay processing, the second delay line is used to transmit the third beam to the horizontal terahertz detector after delay processing, the third delay line is used to transmit the fourth beam to the vertical terahertz detector after delay processing, so that the time of the lasers processed by the beam splitters reaching the terahertz wave generator, the horizontal terahertz detector and the vertical terahertz detector is the same.

10. The terahertz full polarization state detection spectrometer according to claim 9, further comprising three sets of lenses and focusing lenses, which are respectively a first lens and a first focusing lens, a second lens and a second focusing lens, a third lens and a third focusing lens, the terahertz wave generator, the horizontal terahertz detector and the vertical terahertz detector are respectively connected between a set of lens and focusing lens, the first lens is used to transmit the first beam to the terahertz wave generator after focusing processing, the first focusing lens is used to transmit the terahertz wave generated by the terahertz wave generator to the polarizer after collimating, the second lens is used to transmit the third beam to the horizontal terahertz detector after focusing processing, the second focusing lens is used to transmit the horizontal terahertz wave to the horizontal terahertz detector after focusing processing, the third lens is used to transmit the fourth beam to the vertical terahertz detector after focusing processing, and the third focusing lens is used to transmit the vertical terahertz wave to the vertical terahertz detector after focusing processing.

11. The terahertz full polarization state detection spectrometer according to claim 8, further comprising a first delay line, a second delay line, and a third delay line, wherein the first delay line, the second delay line, and the third delay line are located in parallel.

12. The terahertz full polarization state detection spectrometer according to claim 7, further comprising beam splitters in a laser light path, wherein the beam splitters comprise a first beam splitter and a second beam splitter that are directly in series so that a second beam exits the first beam splitter and extends directly into the second beam splitter.

13. The terahertz full polarization state detection spectrometer according to claim 1, wherein a first beam splitter, a second beam splitter, a third delay line, a third lens, the vertical terahertz detector, and third reflector are located in series one after the other.

14. The terahertz full polarization state detection spectrometer according to claim 1, wherein a laser passed through a first beam splitter, a second beam splitter, a second reflector, a second delay line, a second lens, the horizontal terahertz detector, second focusing lens, and then the polarization splitter in sequence.

* * * * *